United States Patent [19]

Namura et al.

[11] Patent Number: 5,549,849

[45] Date of Patent: Aug. 27, 1996

[54] CONDUCTIVE AND EXOTHERMIC FLUID MATERIAL

[75] Inventors: Genji Namura, Moriyama; Masao Takasawa, Tochigi, both of Japan

[73] Assignee: Carrozzeria Japan Co., Ltd., Tokyo, Japan

[21] Appl. No.: 406,650

[22] Filed: Mar. 20, 1995

Related U.S. Application Data

[63] Continuation of Ser. No. 30,490, filed as PCT/JP91/01312, Sep. 30, 1991, abandoned.

[30] Foreign Application Priority Data

Aug. 2, 1991 [JP] Japan ..................................... 3-216299

[51] Int. Cl.⁶ .............................. H01B 1/00; H01B 1/22; H01B 1/24
[52] U.S. Cl. ......................... 252/503; 252/502; 252/506; 252/510; 252/511; 252/512; 252/518; 524/415; 524/496
[58] Field of Search .................................. 252/502, 503, 252/506, 510, 511, 512, 518; 524/495, 496

[56] References Cited

U.S. PATENT DOCUMENTS

| | | | |
|---|---|---|---|
| 4,579,611 | 4/1986 | Broady | 252/506 |
| 4,696,764 | 9/1987 | Yamazaki | 252/503 |
| 4,702,859 | 10/1987 | Shimizu et al. | 252/511 |
| 4,877,554 | 10/1989 | Honma et al. | 252/511 |
| 5,057,245 | 10/1991 | Frentzel et al. | 252/503 |
| 5,334,330 | 8/1994 | Rowlette | 252/511 |
| 5,407,741 | 4/1995 | Ota | 252/511 |

FOREIGN PATENT DOCUMENTS

| | | |
|---|---|---|
| 312688 | 4/1989 | European Pat. Off. . |
| 59-39883 | 9/1984 | Japan . |
| 1108276 | 4/1989 | Japan . |
| 2284968 | 11/1990 | Japan . |

OTHER PUBLICATIONS

English Translation of JP 2-284968 (Published Nov. 22, 1990).

Database WPIL, Week 8748, Feb. 3, 1988, Derwent Pubs., AN 87-33852 & JP-A-62 243 661, Oct. 24, 1987, Abstract.

Database WPIL, Week 8509, Apr. 24, 1985, Derwent Pubs., AN 85-052419 & JP-A-60 008 377, Jan. 17, 1985, Abs.

Patent Abstracts of Japan, C-553, Dec. 15, 1988 & JP-1-63 196 672, Aug. 15, 1988, Abstract.

Patent Abstracts of Japan, C-324, Jan. 23, 1987 & JP-A-60 170 642, Sep. 4, 1985, Abstract.

Patent Abstracts of Japan, C-311, Oct. 29, 1984 & JP-A-60 118 744, Jun. 26, 1985, Abstract.

Daily Journal of Commerce, vol. 97, No. 237, Wed., Oct. 10, 1990, "Hot Paint Sure to be hot Stuff!".

*Primary Examiner*—Paul Lieberman
*Assistant Examiner*—M. Kopec
*Attorney, Agent, or Firm*—Foley & Lardner

[57] ABSTRACT

The conductive and exothermic fluid material contains a powdery material such as particles of carbon black particles and graphite particles, spherical metal particles, a metal oxide and/or a metal salt, and a binder material such as a synthetic resin varnish or a gluey material. The ratio of the powdery material to the binder material is in the range of from approximately 93 to 7 to approximately 55 to 45. The graphite particles have each a long diameter of 300 microns or shorter and a short diameter of 200 microns or shorter. The spherical metal particles and the metal oxide have each a particle size of 300 microns or shorter.

The conductive and exothermic fluid material has a small electrical resistance and it can produce high temperatures with a small magnitude of electric currents.

13 Claims, 3 Drawing Sheets

CONDUCTIVE AND EXOTHERMIC FLUID MATERIAL

This application is a continuation of application Ser. No. 08/030,490, filed as PCT/JP91/01312, Sep. 30, 1991, now abandoned.

TECHNICAL FIELD

The present invention relates to a conductive and exothermic fluid material and, more particularly, to a conductive and exothermic fluid material for providing an exothermic member of such a type as self-controlling temperatures and as creating temperatures up to approximately 800° C. in a uniform distribution of temperatures in a range of from approximately 3 volts to 240 volts.

BACKGROUND ART

A variety of exothermic materials have so far been proposed. For example, Japanese Patent Publication Kokai No. 61(1986)-55,168 proposes heat-resistant conductive paints containing, as a major ingredient, graphite covered with nickel; Japanese Patent Publication Kokai No. 64(1989)-680 proposes a conductive and exothermic paste containing a metal oxide as a major ingredient; Japanese Patent Publication Kokai No. 1(1989)-108,276 proposes conductive and exothermic paints containing spherical carbon particles as a major component. These exothermic materials, however, have relatively high electrical resistance and they cannot provide a sufficient magnitude of electric current, so that they cannot generate a high calorific value. Hence, in order to provide a high calorific value, a density of electric current should be enhanced by shortening a distance between electrodes or by applying high voltage.

Further, Japanese Patent Publication Kokai No. 1(1989)-108,276 discloses conductive and exothermic paints containing as major ingredients carbon particles and a synthetic resin, carbon particles containing approximately 60% or larger than 60% of spherical particles having a particle size of 500 microns or smaller. This publication, however, describes to the effect that conventional exothermic paints comprising carbon particles in the form of flakes, needles, fiber or shells cannot provide a wide exothermic surface having no local heat spots and a uniform distribution of temperatures.

DISCLOSURE OF INVENTION

The conductive and exothermic fluid material according to the present invention comprises a powdery material consisting of carbon particles in the form of scales, spherical metal particles, a metal oxide and/or a metal salt, and a binder material consisting of synthetic resin varnish or a glue material. When electricity is applied to the material constituting and functioning as an exothermic factor, among the materials constituting the powdery material, free electrons are stimulated and move actively, and the energy of motion is converted into heat energy so that electric energy can exert an influence upon exothermic temperatures.

As described hereinabove, the conductive and exothermic fluid materials as shown in conventional art are relatively high in electrical resistance so that they require to shorten the distance between the electrodes and to apply high voltage in order to provide a high calorific value. On the other hand, the conductive and exothermic fluid material according to the present invention can generate high temperatures at a small magnitude of electric current by reducing electrical resistance on the basis of the use of a metal having a high conductivity and containing a large number of movable free electrons. Further, it is of such a type as self-controlling temperatures by using a metal oxide and a crystalline carbon particles, the metal oxide capable of enlarging electrical resistance to an appropriate value by varying temperatures. The irregularity in temperatures which is referred to as one of the drawbacks of the conventional technology, is considered to result from the irregularity in the distribution of temperatures, which is caused by the difference in values of electrical resistance even on the same coating surface due to the difference in the thickness of the coating. In addition, the conductive and exothermic fluid material according to the present invention is provided with the enhanced ability of self-controlling the temperatures by a combination between substances having different numbers of free electrons and further by the presence of the substances having a larger variation of temperatures with electrical resistance, thereby failing to lose its uniformity of temperatures even if there would be some difference between thicknesses of the coating. This further permits the fluid material to be processed into members or bodies with ease.

BEST MODE FOR CARRYING OUT THE INVENTION

Figure 1:
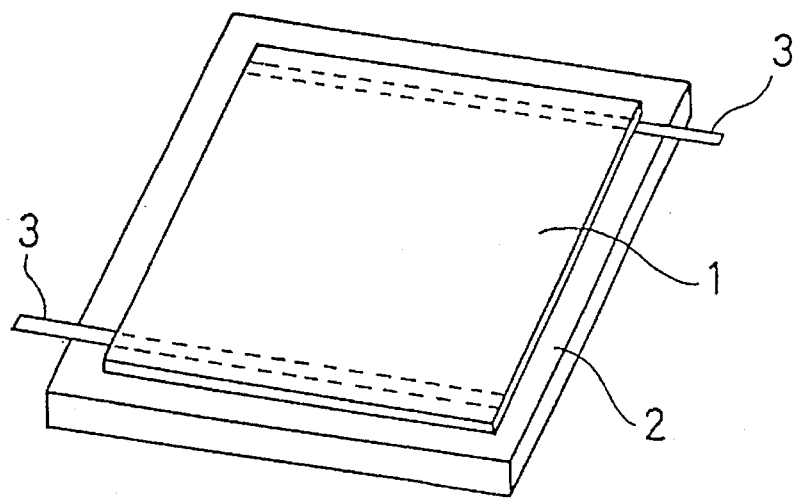
FIG. 1 is a perspective view showing an exothermic body or member according to an embodiment of the present invention.

The conductive and exothermic fluid material according to the present invention basically comprises a powdery material containing the carbon particles in the form of scales, the metal particles, the metal oxide or the metal salt, and the binder material consisting of synthetic resin varnish or the glue material. The powdery material comprising the carbon particles in the form of scales, the metal particles, the metal oxide or the metal salt constitutes a conductive and exothermic factor and/or a conductive factor.

The carbon particles in the form of scales to be employed for the present invention may have their longer diameter in the range of approximately 300 microns or smaller, preferably from approximately 5 microns to 50 microns, more preferably from approximately 10 microns to 20 microns, and their shorter diameter in the range of approximately 200 microns or smaller, preferably from approximately 3 microns to 30 microns, more preferably from approximately 5 microns to 15 microns. The rate of the carbon particles in the form of scales relative to the binder material may advantageously be in the range of from approximately 30% to 85% by weight. If the rate of the carbon particles in the form of scales becomes too large, it is not advantageous because the resulting coating becomes brittle, when the conductive and exothermic fluid material has been coated and the coating has been dried, thereby rendering characteristics as a paint, that is, the performance of the paint for forming a coating, extremely poor.

As the metal particles to be employed for the present invention, there may be mentioned the particles of the metal such as copper, nickel, chromium, cobalt, silver, and the like. Among such metal particles, nickel, chromium and cobalt are preferred. On the other hand, copper is readily oxidized at high temperatures so that there is the limitation upon its uses, while silver can provide the most effective result; however, it is so expensive that it cannot be employed but in special cases. The metal oxide may include, for example, an oxide of a metal, such as iron, copper, nickel, chromium, cobalt or the like. The metal salt may include, for example, a halide of iron, copper, tin, sodium, nickel, chromium, cobalt or the like, and a titanate compound of potassium, aluminum, barium, or the like. Preferred metal oxide may be conductive nickel oxide; preferred metal salts may be a metal halide such as tin chloride and the like and a titanate compound such as aluminum titanate, barium titanate and the like. These metal oxides and metal salts are advantageous in terms of enhancing the ability of self-controlling exothermic temperatures. It is preferred to use the metal particles and the metal oxide, each having a particle size of approximately 300 microns or smaller, preferably approximately 100 microns or smaller, more preferably in the range of from approximately 2 to 15 microns. The metal particles may advantageously be in a spherical shape. The ratio of the carbon particles in the form of scales with respect to the spherical metal particles, the metal oxide or/and the metal salt may conveniently be in the range of approximately 20 to 80 to 80 to 20.

In accordance with the present invention, the powdery material may additionally contain carbon in a form of glue, and KETJEN BLACK® may advantageously be employed as the carbon in the form of glue. KETJEN BLACK is a carbon black developed by Akzo, Inc. in the Netherlands, which has good electrical conductivity. Carbon black exhibits electrically conductive effects in a polymer because its particles form a chain structure, and contact among the particles creates electrical conductivity. KETJEN BLACK, in particular, is useful because it has hollow shell-shaped particles and graphite is aggregated in a thin layer on the outside of the particles. The rate of the gluey carbon may be in the range of approximately 2% to 12% by weight with respect to the powdery material. By adjusting the amount of a substance functioning as a conductive factor, such as the gluey carbon, the value of electrical resistance of the dry coating and the dry material can be controlled so as to be adapted to an arbitrary electric source ranging from 3 volts to 40 volts, so that it is extremely useful. Further, high temperatures can be created and generated even at low voltage. Hence, the conductive and exothermic fluid material according to the present invention can be adapted to a wide variety of industrial uses, such as materials of public properties, and conditions. On the other hand, if the addition of such a conductive factor is too small or too large, such effects cannot be achieved or the effects commensurate with such addition cannot be provided.

The synthetic resin constituting the synthetic resin varnish among the binder materials may include, for example, an acryl resin, a polyester resin, an alkyd resin, a vinyl resin, a polyolefin resin, a silicone resin, a polytitanocarbosilane resin, and the like.

The inorganic glue material constituting the binder material may include, for example, cement powder such as lime cement, silicate cement, magnesium cement, etc., gypsum powder such as gypsum, plaster, gypsum cement, calcined gypsum, etc., colloidal silica, and the like.

The synthetic resins or the inorganic glue substance to be employed as the binder for the conductive and exothermic fluid material are an electrically poor conductor. They may disperse the particles of the powdery material constituted by the conductive and exothermic factor or the conductive factor, and they may coat each of the particles thereof so that the resulting conductive and exothermic fluid material does not reduce its value of electrical resistance.

The powdery material (A) containing the conductive and exothermic substance in a coating obtained by coating the conductive and exothermic fluid material according to the present invention and drying the coating may be contained in the ratio of the powdery material (A) to the binder material (B) containing the synthetic resin varnish and/or the inorganic glue material in the range of from approximately 93 (A) to 7 (B) to 55 (A) to 45 (B), preferably from approximately 85 (A) to 15 (B) to 65 (A) to 35 (B). The ratio of the powdery material (A) to the binder material (B) exerts a great influence upon the value of electrical resistance of a coating obtained by coating the conductive and exothermic fluid material and drying the resulting coating. In other words, if the quantity of the binder material would be too small, on the one hand, the resulting coating becomes brittle and likely to crack, when it is dried. If the amount of the binder material is too large, on the other hand, it is difficult to practically use the resulting conductive and exothermic fluid material, because its value of electrical resistance may become of the order of kiloohms and it cannot be made exothermic without application of high voltage, although the resulting coating may function as an exothermic coating. Hence, in order to make the conductive and exothermic fluid material exothermic in the working voltage range (i.e. 100 volts or lower), it is advantageous to set the quantity of the binder material within the preferred range as described hereinabove.

The conductive and exothermic fluid material according to the present invention prepared in the manner as described hereinabove may be applied to various objects. Such objects may include, for example, various materials such as metals, plastic materials, wooden materials, paper, concrete and the like. It is noted herein that a base member made of these conductive materials may be treated in advance for covering them with an electrically insulating material. As the method for applying the conductive and exothermic fluid material according to the present invention to the objects, there may be employed a variety of conventional methods including, for example, brushing, roller coating, spraying, electrostatic deposition, electrodeposition, pouring for preparing blocks, and the like. In this case, a variety of diluting agents may be employed to adjust a viscosity of the conductive and exothermic fluid material. Further, in order to appropriately maintain the characteristics of the conductive and exothermic fluid material, additives other than the diluting agents may also be employed; such additives may include, for example, a sedimentation preventive agent, a dispersing agent, an antioxidant, a levelling agent, a colorant, and the like.

As the diluting agents to be employed for operations to be conducted by using the conductive and exothermic fluid material according to the present invention, there may be mentioned conventional solvents and so on which have been generally employed for paints, and such solvents may include, for example, an aliphatic hydrocarbon, an aromatic hydrocarbon such as toluene, xylene, etc., an aromatic petroleum naphtha, an alcohol such as isopropyl alcohol, butanol, etc., an alcohol ether such as ethyl Cellosolve®, butyl Cellosolve®, ethylene glycol monoether, etc., an ether, an ester such as an acetate, an acid anhydride, ethyl Cellosolve® acetate, etc., a ketone such as methyl ethyl ketone, methyl isobutyl ketone, etc., water, and the like. These solvents may appropriately be chosen in accordance with the kind of the material to be added as the binder material. The quantity of the diluting agent may be determined depending upon the properties of the synthetic resin and the inorganic glue material.

In addition, the sedimentation preventing agent to be employed as a secondary additive may include, for example, methyl cellulose, carboxymethyl cellulose, calcium carbonate, denatured bentonite, and so on. As the dispersing agent, a variety of surfactants such as an anionic surfactant may be chosen appropriately.

When the conductive and exothermic fluid material according to the present invention is applied to the objects as described hereinabove, the resulting objects are then processed by heating. It is to be noted, however, that when they are to be heated for processing, the objects are caused to expand due to the heat and to shrink by cooling. When the area and the volume of the processed objects are caused to vary by expansion or shrinking, the problem may arise that the coating of the conductive and exothermic fluid material coated on the processed objects may be caused to be broken or cracked. A drying oil or a semi-drying oil or a derivative thereof may be added to the synthetic resin to be employed as the binder material in order to provide the processed objects with flexibility to follow or absorb the expansion or shrinkage. The quantity of these fats and oils may conveniently range from approximately 0.5% to 5% by weight with respect to the weight of the synthetic resin. When the quantity of the fats and oils is too small, the effect sought to be achieved by addition of them cannot be given; on the other hand, when the quantity of them is too large, it suffers from the disadvantages that the period of time required for drying the coating may become too long and the original ability of the synthetic resin for forming a coating may be lost.

A conductive and exothermic body or member may be prepared by coating the conductive and exothermic fluid material according to the present invention in a desired form on the surface of a solid material, as a base material, including a metal, plastics, ceramics, wooden material, fibrous material, paper, and the like, on each of which at least two metal terminals are fixed. Further, the conductive and exothermic fluid material may be molded into, for example, brick-shaped, roofing-tile-shaped and tile-shaped members by filling it in a desired frame and drying it.

The quantity of the conductive and exothermic fluid material according to the present invention to be coated is not restricted to a particular one and it is sufficient as long as it can provide a continuous coating. Although the film thickness of the dry coating may appropriately be in the range of from 0.05 mm to 0.3 mm, it may be determined depending upon the quantity of non-volatile materials contained in the conductive and exothermic fluid material to be employed. In addition, the shape or form of the base material is not restricted to a shape or form having a flat surface, a curved surface, or the like, and it may readily be formed into the exothermic body or member even if it is of the shape of a wire, a rod, or the like or in a three-dimensionally curved form such as a cylindrical form or the like.

Although the drying period of time after the conductive and exothermic fluid material according to the present invention has been coated may vary depending upon the selection of the diluting agent, the period of time required for making the coating dry to the touch may range from approximately 20 minutes to 60 minutes. It is preferred that the coating may be further dried by heating at 60° C. to 180° C. after having the coating made dry to the touch, although the coating may be dried at natural conditions (drying at ambient temperature). It is then required that the dry coating is coated or covered with an electrically insulating material in the possible thinnest film thickness as required from the point of view of physical strength in order to prevent a short circuit. It is not desired, however, that the insulating material be coated thereon in a film thickness thinner than necessary, because such a thick coating suppresses heat from transferring.

EXAMPLES

The present invention will be described more in detail by way of examples, but it is to be understood as a matter of course that the present invention is not restricted in any respect to those examples as described hereinafter.

EXAMPLE 1

A conductive and exothermic powdery material was prepared by uniformly mixing 50 parts of spherical metal particles (consisting of 40 parts of nickel particles having diameters of 0.5 micron to 5.0 microns and 10 parts of chromium particles having diameters of 0.5 micron to 5.0 microns), 40 parts of graphite in the form of scales (particles of graphite in the form of scales, having diameters of 30 microns to 40 microns), and 10 parts of gluey, organic carbon particles (particles of spherical organic carbon having diameters of 5 microns to 15 microns).

To 100 parts of the resulting powdery material, there were added 24 parts of resin varnish (consisting of 18 parts of silicone resin varnish, 4 parts of melamine modified alkyd resin varnish, and 2 parts of epoxy resin varnish) as a binder, 5 parts of an equivalent mixture of a silicone resin monomer and a phosphate ester of octylic acid as a sedimentation preventing agent for the metal particles and a stabilizer, and 98 parts of solvents (49 parts of xylene, 29 parts of methyl isobutyl ketone, and 20 parts of ethyl acetate) as a developing agent, and the resulting mixture was stirred at 100 to 240 rpm with a stirrer, thereby yielding a homogeneous fluid material. To this fluid material was added 17 parts of a 50% solution of stannous chloride (in an equivalent mixture of solvents consisting of isopropyl alcohol and isobutyl Cellosolve®), thereby providing a gluey fluid material having strong thixotropic properties. The ratio of the powdery material (A) to the binder resin (B) was found to be 90 (A) to 10 (B).

The resulting fluid material was brushed on a tile plate 2 (15 cm×15 cm) on which copper tapes 3 have been attached as electrodes, and the coating was dried at ambient temperature, followed by drying it by heating it at 130° C. for 3 hours to give an exothermic body having a dry coating 1 having a film thickness of 0.1 mm to 0.12 mm. The electrical resistance of the exothermic body was found to be 4.3 $\Omega/cm^2$. The temperatures on the surface of the exothermic body are as indicated by reference numeral 1 in FIG. 3, when tested by applying electricity at voltage of 24 volts and in a distance between the electrodes of 10 cm.

EXAMPLE 2

The procedures for the preparation used in this example are the same as in Example 1 and the rates of the materials employed are as follows:

| | |
|---|---|
| Carbon particles in the form of scales | 25.7 parts |
| (particles of graphite in the form of scales, | 25.7 parts) |
| 30–40 microns | |
| Gluey organic carbon particles | 9.3 parts |
| (gluey carbon particles, 5–15 microns) | |
| Spherical metal particles | 28 parts |
| (nickel particles, 0.5–5.0 microns, | 22.4 parts; |
| chromium particles, 0.5–5.0 microns, | 5.6 parts) |
| Metal salt | 31.4 parts |
| (barium titanate, 10–15 microns) | |
| Metal oxide | 5.6 parts |
| (nickel oxide, 2–5 microns) | |
| Resin varnish | 17 parts |
| (silicone resin varnish | 11.3 parts; |
| melamine modified alkyd | 3.8 parts; |
| resin varnish | |
| epoxy resin varnish | 1.9 parts) |
| Additives | 12 parts |
| (silicone resin monomer | 2.4 parts; |
| phosphate ester of octylic acid | 4.8 parts; |
| sulphorane | 4.8 parts) |
| Solvents | 94 parts |
| (xylene | 54.6 parts; |
| methyl isobutyl ketone | 21.1 parts; |
| ethyl acetate | 18.2 parts) |
| A 50% solution of stannous bromide | 21 parts |
| in the solvents | |

The ratio of the powdery material (A) to the binder material (B) in the fluid material is 92 (A) to 8 (B) and the resulting fluid material is in the form of a soft paste.

The fluid material was brushed on a tile plate 2 (15 cm×15 cm) on which copper tapes 3 were bonded as electrodes, in the same manner as in Example 1, and the resulting exothermic body was dried at ambient temperature, followed by drying at 80° C. for 3 hours to provide a coating 1 having a dry film thickness of 0.1 mm to 0.15 mm.

The electrical resistance of the exothermic body was 7.1 $\Omega/cm^2$ when measured in the same manner as in Example 1. The temperatures on the surface of the exothermic body were as indicated by reference numeral 2 in FIG. 3, when electricity was applied to the exothermic body.

EXAMPLE 3

The fluid material in this example was prepared in the same manner as in Example 1 by blending the following materials at the rates as follows:

| | |
|---|---|
| Particles of graphite in the form of scales | 69.2 parts |
| (30–40 microns) | |
| Particles of graphite in the form of scales | 10.7 parts |
| (10–20 microns) | |
| Particles of organic carbon in the form of glue | 18.8 parts |
| (2–5 microns) | |
| Additive (amine salt of polyester) | 1.3 parts |
| Solvent (xylene) | 62.3 parts |
| Silicone resin varnish | 52.7 parts |

The ratio of the powdery material (A) to the binder resin (B) of the resulting fluid material was 79 (A) to 21 (B).

The fluid material was brushed on a tile plate 1 (15 cm×15 cm) on which copper tapes 3 were bonded as electrodes, in the same manner as in Example 1, and the resulting exothermic body was dried at ambient temperature, followed by drying at 80° C. for 3 hours to provide a coating having a dry film thickness of 0.1 mm to 0.18 mm. The electrical resistance of the exothermic body was 12.7 $\Omega/cm^2$ when measured in the same manner as in Example 1. The temperatures on the surface of the exothermic body were as indicated by reference numeral 3 in FIG. 2, when electricity was applied to the exothermic body.

EXAMPLE 4

The fluid material in this example was prepared by the following materials as follows:

| | |
|---|---|
| Particles of graphite in the form of scales | 23.3 parts |
| (10–20 microns) | |
| Spherical metal particles | 33.3 parts |
| (nickel particles, 0.5–5.0 microns, | 28.3 parts; |
| (chromium particles, 0.5–5.0 microns, | 5.0 parts) |
| Carbon particles | 7 parts |
| (particles of graphite in the form of | 5.0 parts; |
| slime, microns | |
| organic carbon particles in the form of | 3.4 parts) |
| glue, 1–2 microns | |
| Metal salts | 35.0 parts |
| (nickel chloride | 5.0 parts; |
| barium titanate | 30.0 parts) |

The aforesaid materials were stirred at 80–100 rpm for 2 hours to give a homogeneous mixture of the conductive and exothermic powdery materials.

To 100 parts of the homogeneous conductive and exothermic powdery mixture were added 67 parts of calcined gypsum as a coagulating agent, and the mixture was stirred for 1 hour to give a homogeneous mixture to which in turn were added 55 parts of water gradually with stirring to thereby give a fluid body in the form of a paste.

Figure 2:
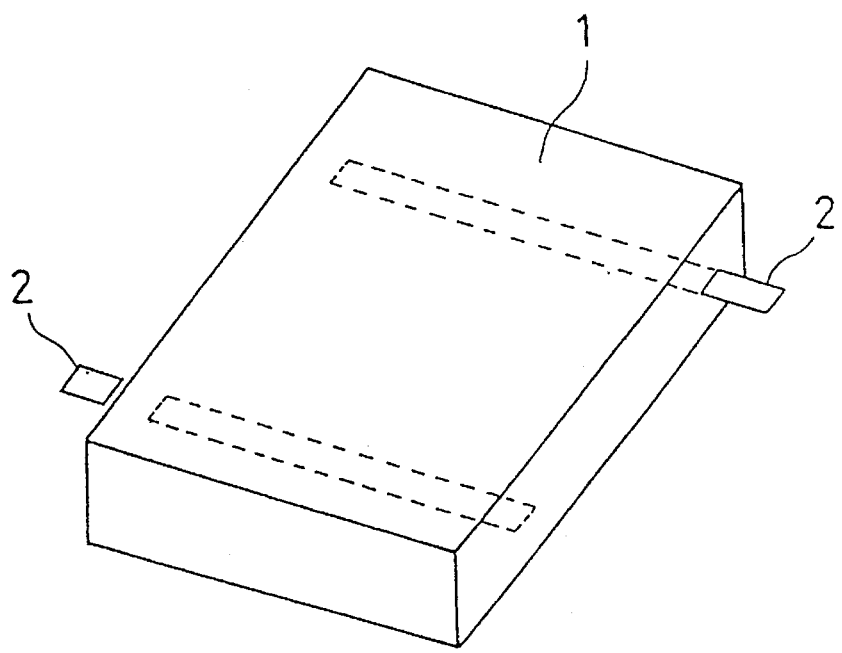
FIG. 2 is a perspective view showing an exothermic body or member according to another embodiment of the present invention.

The resulting fluid body was then poured into a wooden frame (15 cm×10 cm×3 cm) with thin stainless plates 2 interposed as an electrode as shown in FIG. 2. The wooden frame was coated in advance with a hydrophobic lubricant. The fluid body poured was allowed to coagulate in approximately 1 hour and taken out from the frame after it had been allowed to stand for 2 hours because it contained a large quantity of water, followed by drying it at 60° C. for 3 hours, then raising the temperature gradually to 180° C., and drying it at that temperature for 2 hours to give an exothermic body 1 in the form of a brick.

Figure 4:
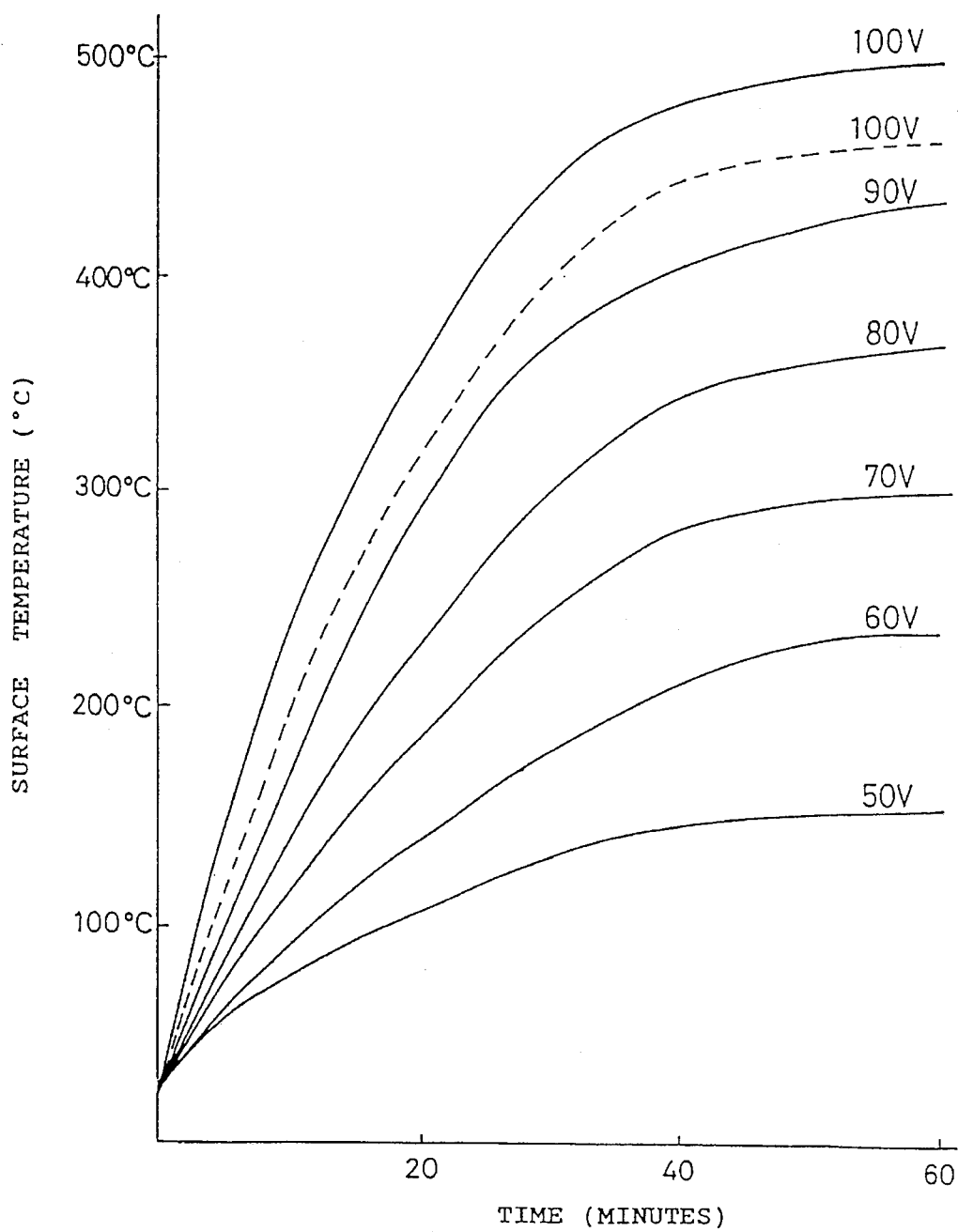
FIG. 4 is a graph showing another case of the relationship between temperatures on the surface of the exothermic body or member according to the present invention and periods of time during which electricity has been applied.

The electrical resistance of the exothermic body was 40.3 $\Omega/cm^2$. The temperatures on the surface of a test specimen of the exothermic body are as indicated by the solid line in FIG. 4, when electricity was applied to the electrodes disposed apart in 10 cm therebetween by varying voltages as shown in FIG. 4.

EXAMPLE 5

The conductive and exothermic fluid material used in this example is adapted to be suitable for the preparation of an exothermic body to which an electric source of working voltage (100 volt) can be applied intact, and the conductive and exothermic fluid material was prepared in the manner as will be described hereinafter. The procedures for the preparation were the same as in Example 1 and the kinds and rates of the materials used were as follows:

| | |
|---|---|
| Ceramics powdery material | 12 parts |
| (particles of alumina ceramics, | 6 parts; |
| 10–20 microns, | |
| particles of silica-type ceramics, | 6 parts) |
| 20–30 microns, | |
| Metal salts | 38 parts |
| (particles of barium titanate, | 25 parts; |
| 15–20 microns, | |

-continued

| | |
|---|---|
| particles of aluminum titanate, 15–30 microns, | 13 parts) |
| Spherical metal particles | 25 parts |
| (nickel particles 0.5–5.0 microns, | 16 parts; |
| chromium particles, 0.5–5.0 microns, | 9 parts) |
| Graphite & Organic Carbon | 25 parts |
| (particles of graphite in the form of scales, 10–20 microns, | 16 parts; |
| particles of graphite in the form of slime, 5–10 microns, | 6.8 parts; |
| particles of organic carbon in the form of glue, 1–2 microns, | 2.2 parts) |
| Resin varnish | 77 parts |
| (silicone resin varnish, | 41 parts; |
| acrylic resin varnish, | 18 parts; |
| epoxy resin varnish, | 18 parts) |
| Additives | 9 parts |
| (sulfolane | 2.2 parts; |
| silicone resin monomer, | 3.4 parts; |
| phosphate ester of oleic acid, | 1.8 parts; |
| oleic amide, | 1.6 parts) |
| Solvents | 41 parts |
| (xylol, | 22.8 parts; |
| methyl isobutyl ketone, | 11.4 parts; |
| ethyl acetate, | 6.8 parts) |

The ratio of the powdery materials (A) to the binder resin (B) in the resulting fluid material was 70 (A) to 30 (B), and the resulting fluid material had great thixotropic properties.

The fluid material was brushed on a tile plate 2 (15 cm×15 cm) on which copper tapes 3 were bonded as electrodes, in the same manner as in Example 1, and the resulting exothermic body was dried at ambient temperature, followed by drying at 80° C. for 1 hour and then at 130° C. for 2 hours to provide a coating 1 having a dry film thickness of 0.1 mm to 0.15 mm. The electrical resistance of the exothermic body was 47.6 $\Omega/cm^2$ when measured in the same manner as in Example 1. The temperatures on the surface of the exothermic body were as indicated by dotted line in FIG. 4, when electricity was applied at working voltage of 100 volts to the exothermic body with the electrodes disposed apart in 10 cm.

EXAMPLE 6

The conductive and exothermic fluid material of this example was prepared for the purpose to confirm the effect of the addition of a drying oil or a semi-drying oil. The preparation was formulated in the same manner as in Example 1 by using the materials at the rates as follows:

| | |
|---|---|
| Graphite & organic carbon | 68.9 parts |
| (particles of graphite in the form of scales, 30–40 microns, | 49.2 parts; |
| particles of organic carbon, 5–10 microns, | 16.4 parts; |
| particles of organic carbon in the form of glue, 1–2 microns, | 3.3 parts) |
| Spherical metal particles | 28.4 parts |
| (nickel particles, 0.5–5.0 microns, | 21.3 parts; |
| chromium particles, 0.5–5.0 microns, | 7.1 parts) |
| Nickel oxide particles, 2.0–5.0 microns | 2.7 parts |
| Resin varnish | 34.2 parts |
| (silicone resin varnish | 16.4 parts; |
| acrylic resin varnish | 12.3 parts; |
| epoxy resin varnish | 5.5 parts) |
| Fats & oils | 29.3 parts |
| (thermally polymerized paulownia oil, | 8.2 parts; |
| thermally polymerized linseed oil, | 19.1 parts; |
| thermally polymerized soybean oil, | 2.0 parts). |
| Additives | 8.7 parts |
| (phosphate ester of octylic acid, | 1.4 parts; |
| silicone resin monomer, | 3.5 parts; |
| sulfolane | 2.8 parts) |
| Solvents | 84.6 parts |
| (xylene | 54.6 parts; |
| methyl isobutyl ketone | 20.0 parts; |
| ethyl acetate | 10.0 parts) |
| 50% solution of stannous chloride | 16.4 parts |

The ratio of the powdery materials (A) to the binder resin (B) in the resulting fluid material was 70 (A) to 30 (B).

The fluid material was brushed on a tile plate 2 (15 cm×15 cm) on which copper tapes 3 were bonded as electrodes, in the same manner as in Example 1, and the resulting exothermic body was dried at ambient temperature, followed by drying at 80° C. for 3 hours to provide a coating 1 having a dry film thickness of 0.13 mm to 0.16 mm. The electrical resistance of the exothermic body was 6.5 $\Omega/cm^2$ when measured in the same manner as in Example 1. The temperatures on the surface of the exothermic body were as indicated by reference numeral 6 in FIG. 3, when electricity was applied.

Further, the fluid material was coated on a 30×15×0.01 cm PET (polyethylene terephthalate) film on which copper tapes were bonded as electrodes, and the resulting coating was dried at ambient temperature and then at 80° C., thereby forming an exothermic body in the form of a film. This film body was measured for strength upon bending and it was found that the coating on the film body did not cause any cracking or coming off even when it was curved at 180° with a radius of curvature of 2 mm.

EXAMPLE 7

In order to confirm the effect of the addition of the organic carbon in the form of glue and the metal halide, the formulations were prepared by reducing the additives from the preparation of Example 1 and measured for electrical resistance. The procedures for preparation were the same as in Example 1 and the rates of the components are as follows:

TABLE 1

| | A*) | B | C | D |
|---|---|---|---|---|
| Spherical metal particles | 20.0 | 20.0 | 20.0 | 20.0 |
| Carbons | 20.0 | 20.0 | 20.0 | 20.0 |
| Organic carbon in the form of glue | 1.0 | 0.0 | 1.0 | 0.0 |
| Resin varnish | 9.8 | 9.8 | 9.8 | 9.8 |
| Additives | 2.2 | 2.2 | 2.2 | 2.2 |
| Solvents | 40.0 | 40.0 | 40.0 | 40.0 |
| 50% solution of stannous chloride | 7.0 | 0.0 | 0.0 | 7.0 |

Notes: *)The formulation is the same as in Example 1.

| | |
|---|---|
| Spherical metal particles: | |
| nickel particles, 0.5–5.0 microns, | 16 parts; |
| chromium particles, 0.5–5.0 microns, | 4 parts |
| Carbons: | |
| graphite in the form of scales, 30–40 microns, | 16 parts; |
| spherical organic carbon, 5–15 microns, | 4 parts |
| Resin varnish: | |
| silicone resin varnish | 7.3 parts; |

-continued

| | |
|---|---|
| melamine modified alkyd resin varnish | 1.5 parts; |
| epoxy resin varnish | 1.0 part |
| Additives: | |
| equivalent mixture of phosphate ester of octylic acid and silicone resin monomer | |
| Solvents: | |
| xylene | 20 parts; |
| methyl isobutyl ketone | 12 parts; |
| ethyl acetate | 8 parts |

In the aforesaid formulations, respectively, the ratios of the powdery material (A) to the binder resin (B) are as follows:
A: 90 (A) to 10 (B); B: 88.4 (A) to 11.6 (B); C: 88.6 (A) to 11.4 (B); D: 89.2 (A) to 10.8 (B).

Each of the aforesaid formulations was coated on a tile plate 2 (15 cm×15 cm) on which copper tapes 3 had been bonded as electrodes, in the manner as in Example 1, followed by drying the resulting coating at ambient temperature and then at 80° C. for 3 hours to provide an exothermic body having a coating 1 in a dry film thickness as will be described hereinafter.

Each of the resulting exothermic bodies was measured for electrical resistance and the electrical resistance of each exothermic body was as follows:

7A: 4.3 $\Omega/cm^2$ (film thickness: 0.10–0.12 mm)
7B: 126.0 $\Omega/cm^2$ (film thickness: 0.12–0.15 mm)
7C: 6.3 $\Omega/cm^2$ (film thickness: 0.11–0.15 mm)
7B: 91.6 $\Omega/cm^2$ (film thickness: 0.11–0.15 mm)

Figure 3:
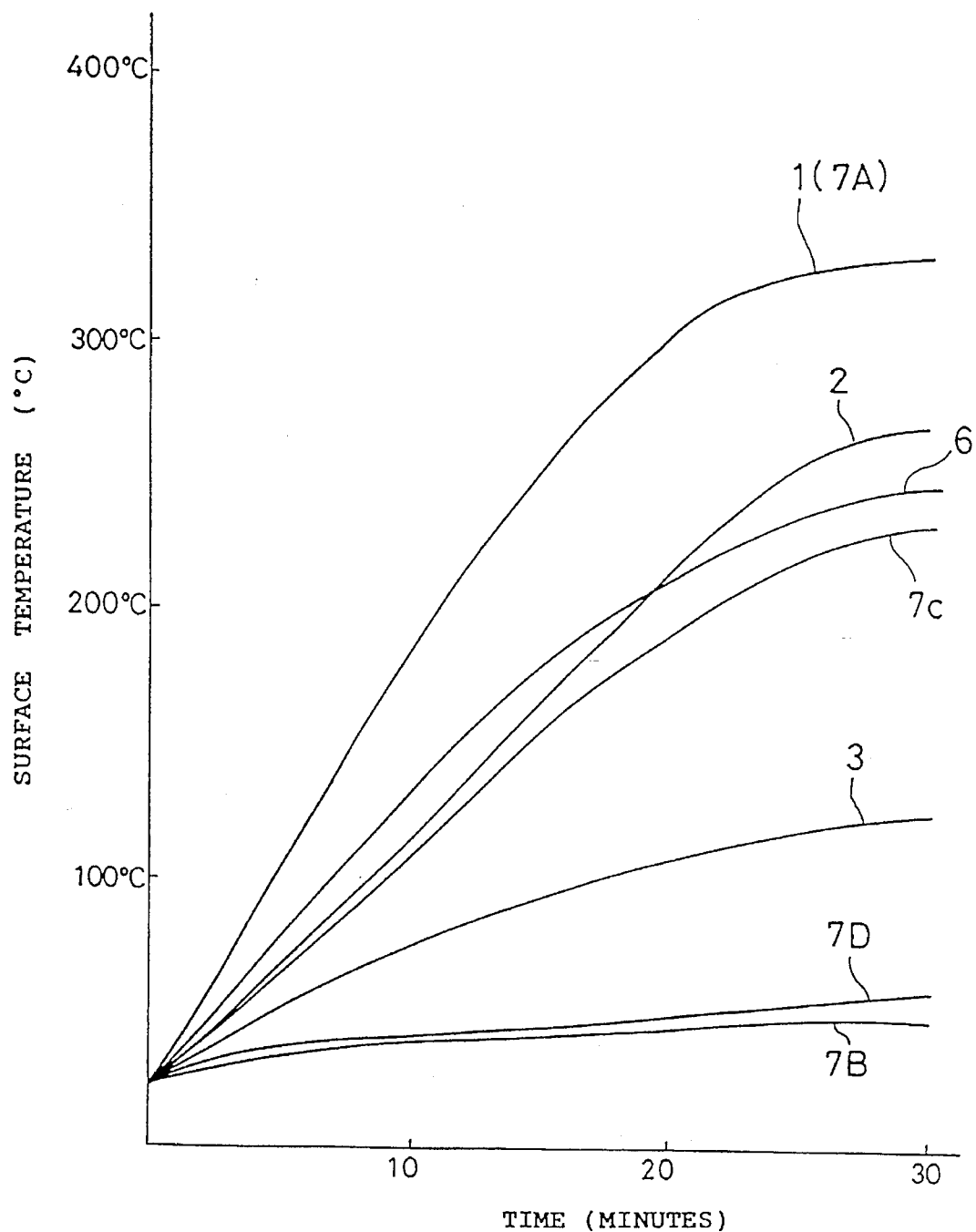
FIG. 3 is a graph showing a case of the relationship between temperatures on the surface of the exothermic body or member according to the present invention and periods of time during which electricity has been applied.

The temperatures on the surfaces of the exothermic bodies as test samples are as indicated by the corresponding symbols in FIG. 3, when electricity was applied thereto.

INDUSTRIAL APPLICABILITY

As described hereinabove, the conductive and exothermic fluid material according to the present invention can create high temperatures by using, as a major component, a metal having a high conductivity having a large number of movable and free electrons to thereby make electrical resistance smaller, and it is an exothermic fluid material of a type of self-controlling temperatures. Further, the conductive and exothermic fluid material according to the present invention has improved its ability of self-controlling temperatures by combining different substances having different numbers of free electrons and by using a substance having a large variation in electrical resistance with temperatures, so that it can be processed into bodies and members in which their uniformity in temperatures is not made irregular even if the film thicknesses of the coating on the exothermic body would vary to some extent.

We claim:

1. An electrically conductive and exothermic fluid material comprising a powdery material, said powdery material comprising:

first graphite particles having a long diameter of 5 to 300 microns and a shorter diameter of 3 to 200 microns;

at least one metal component selected from a spherical metal particle having a particle size less than or equal to 300 µm, a metal oxide having a particle size less than or equal to 300 µm, a metal salt, and mixtures thereof, wherein the ratio of said first carbon particles to said metal component ranges from 20:80 to 80:20; and electrically conductive carbon black particles which are admixed in an amount of 2% to 12% by weight relative to the total weight of said powdery material;

wherein said powdery material is dispersed in a binder selected from synthetic resin varnish, an inorganic material, and mixtures thereof, said inorganic material being cement, gypsum or silica, and wherein the ratio of said powdery material to said binder ranges from 93:7 to 55:45, and said graphite particles being admixed in an amount of 30% to 85% by weight relative to the total weight of said binder.

2. An electrically conductive and exothermic fluid material as claimed in claim 1, wherein the ratio by weight of said powdery material to said binder ranges from 85:15 to 65:35.

3. An electrically conductive and exothermic fluid material as claimed in claim 1, wherein the metal component comprises spherical metal particles, said spherical metal particles comprising copper, nickel, chromium, cobalt or silver.

4. An electrically conductive and exothermic fluid material as claimed in claim 1, wherein the metal component is a metal oxide of iron, copper, nickel, chromium or cobalt.

5. An electrically conductive and exothermic fluid material as claimed in claim 1, wherein said metal component is a metal salt, said metal salt comprising an iron halide, a copper halide, a tin halide, a sodium halide, a nickel halide, a chromium halide, a cobalt halide, a potassium titanate, an aluminum titanate or a barium titanate.

6. An electrically conductive and exothermic fluid material as claimed in claim 1, wherein the binder is a synthetic resin varnish, said synthetic resin varnish comprising an acrylic resin, a polyester resin, an alkyd resin, a vinyl resin, a polyolefinic resin, a silicone resin, or a polytitanocarbosilane resin.

7. An electrically conductive and exothermic fluid material as claimed in claim 1, wherein said binder is cement, said cement comprising lime cement, silicate cement or magnesium cement.

8. An electrically conductive and exothermic fluid material as claimed in claim 1, wherein said synthetic resin varnish contains a drying oil or a semi-drying oil or a derivative thereof.

9. An electrically conductive and exothermic material as claimed in claim 8, wherein said drying oil or semi-drying oil or derivative thereof is present in an amount of from about 0.5% to 5% by weight with respect to said synthetic resin.

10. An electrically conductive and exothermic fluid material as claimed in claim 6, wherein the binder is a synthetic resin varnish, said synthetic resin varnish including a drying oil or a semi-drying oil or a derivative thereof.

11. An electrically conductive and exothermic fluid material as claimed in claim 1, wherein said binder comprises gypsum, said gypsum comprising plaster, calcined gypsum, gypsum cement.

12. An electrically conductive and exothermic fluid material as claimed in claim 1, wherein said electrically conductive carbon black particles are comprised of a carbon black which forms a chain structure in a polymer.

13. An electrically conductive and exothermic fluid material as claimed in claim 11, wherein said electrically conductive carbon black particles comprise hollow shell-shaped particles and graphite is aggregated in a thin layer on the outside of said hollow shell-shaped particles.

* * * * *